Nov. 6, 1956   B. DENZLER   2,769,644
CHUCKS
Filed Nov. 6, 1952   2 Sheets-Sheet 1

INVENTOR.
BERTHOLD DENZLER
BY  Max R. Kraus
ATTORNEY.

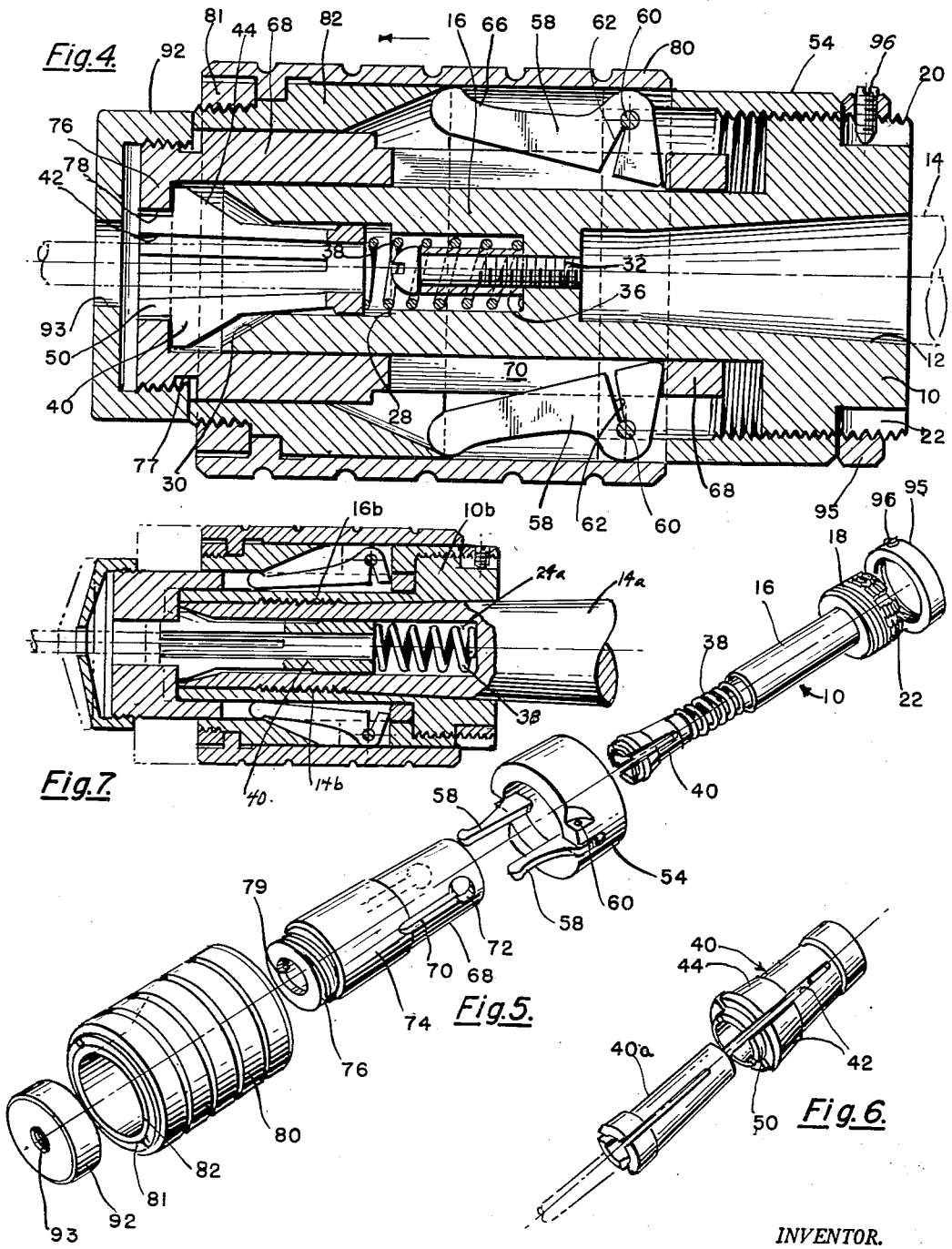

United States Patent Office 2,769,644
Patented Nov. 6, 1956

2,769,644

CHUCKS

Berthold Denzler, Chicago, Ill., assignor to Davos Products Co., Chicago, Ill., a partnership Application November 6, 1952, Serial No. 318,975

4 Claims. (Cl. 279—51)

This invention relates to improvements in chucks, particularly to a collet chuck.

One of the objects of this invention is to provide a collet adapted for use on ordinary lathes and the like in which the tool held in the chuck may be released and removed therefrom and a new tool inserted and gripped while the lathe continues to operate with the chuck rotating.

Another object is to provide a collet chuck having a minimum number of parts in which the insertion and removal of the tool held by the chuck may be readily accomplished in a minimum of time and effort.

Another object is to provide a collet chuck having means for equalizing the pressure and compensating for wear of the parts and which permits the collet to firmly grip tools of various sizes and tolerances.

Another object is to provide a collet chuck which is adjustable to accommodate tools of varying sizes.

Another object is to provide a collet chuck which may support a collet within a collet and a tool in the first mentioned collet.

Other objects will become apparent as this description progresses.

In the drawings:

Fig. 4 is a view similar to Fig. 3 with the parts in position for removal or insertion of the tool.

Fig. 5 is an exploded perspective view of the parts.

Fig. 6 is an exploded perspective view of a pair of interfitting collets, and

Fig. 7 is a cross sectional view similar to Fig. 3 but showing a modified construction.

Figure 1:
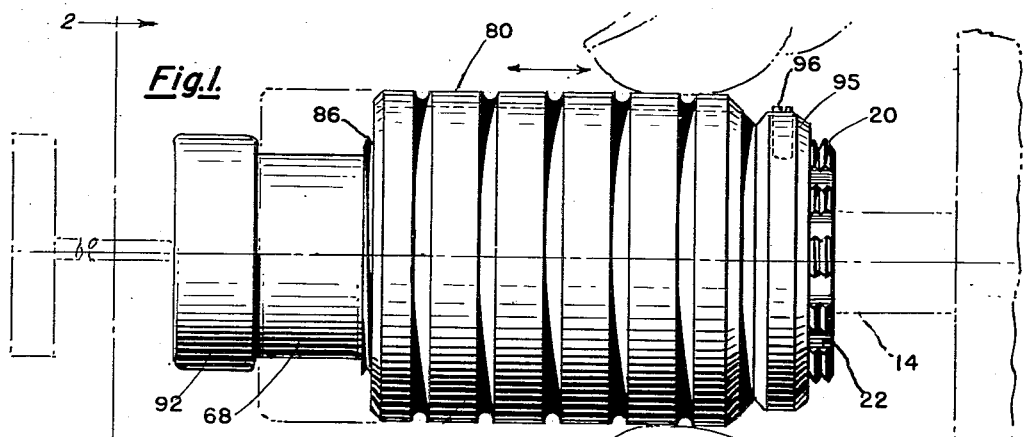
Fig. 1 is a side view of my chuck.

Referring to the drawings the numeral 10 designates a chuck body having a tapered axial bore 12 to receive the driving shaft 14 of the lathe and on which the chuck is secured. The tapered bore may be made of any size to fit any individual smooth or threaded shaft. The chuck body has a forwardly extending elongated cylindrical stem 16 and an integrally formed enlarged rearward portion 18 peripherally threaded as at 20. Spaced peripheral slots 22 are provided on the rear of the enlarged portion. The cylindrical stem 16 is provided with a pair of coaxial communicating bores 24 and 26. The inner bore 24 has a smaller circumference than bore 26 with a shoulder 28 therebetween. The mouth of bore 26 is provided with a tapered circumferential surface 30. Bore 26 forms the collet receiving socket. A bolt 32 is coaxially confined within bore 24 and is threadedly secured to the stem 16 as at 34. The bolt supports a jacket 36 thereon between the head of the bolt and the base of the bore. A coiled spring 38 encircles the bolt and jacket and extends forwardly thereof to engage the rear end of a split collet generally indicated at 40. The collet 40 is rendered radially expansible and contractible by providing a plurality of slots 42. The head 44 of the collet has a tapered circumferential surface 46, a shoulder 48 and a circumferential forwardly extending lip 50. The slots 42 extend through the shoulder and lip. The split collet 40 is slidably received in the bore 26 and the tapered head 44 of the collet extends forwardly of the cylindrical stem 16. The forward end of spring 38 engages the rear of the collet to normally urge same forward or outwardly and the shoulder 28 acts as a stop for the rearward movement of the collet.

Threadedly secured as at 52 to the peripherally threaded body portion 18 is a sleeve 54, the forward end of which is provided with diametrically opposed slots 56. A pair of levers 58, each received in a slot 56, is mounted on pivots 60 secured in the sleeve 54. The levers each have an inverted V shaped cutout or slot 62 which extends from the outer end to the pivot 60. The slotted levers provide a spring action which equalizes the pressure and compensates for wear of the parts. It also permits the collet to firmly grip tools of various sizes and tolerances. The rear end of the levers have cam surfaces 64 and the forward end have rounded terminal portions 66.

Figure 3:
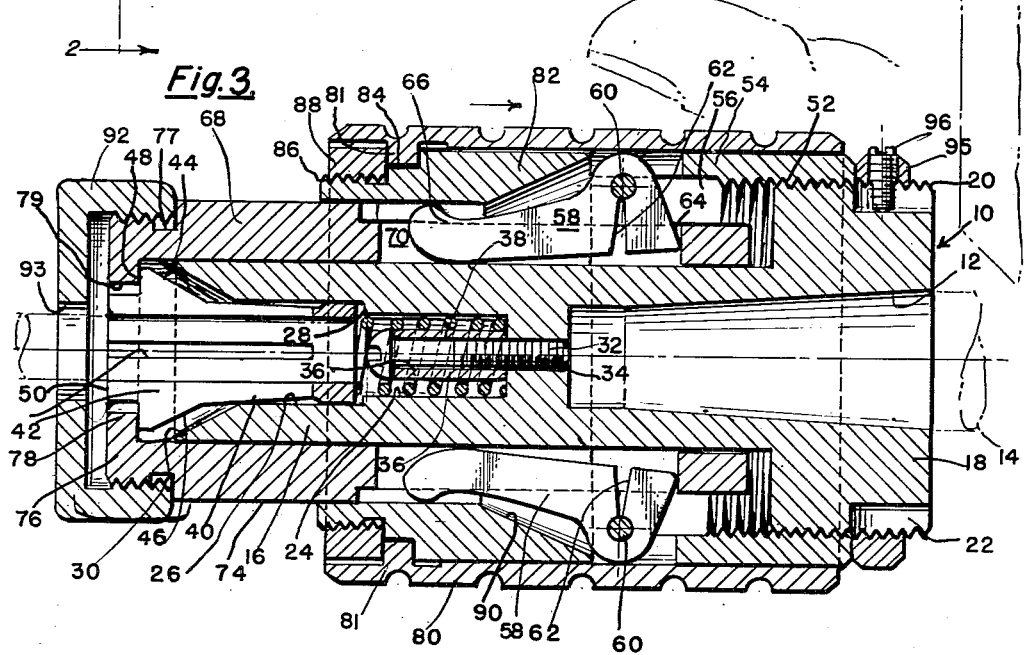
Fig. 3 is a cross sectional view taken on line 3—3 of Fig. 2.
Figure 2:
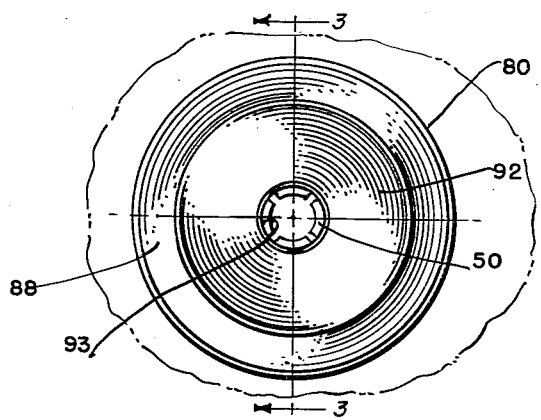
Fig. 2 is an end view taken on line 2—2 of Fig. 1.

Slidable axially on the stem 16 is a draw sleeve generally indicated at 68, which sleeve has diametrically opposed longitudinal slots 70, each slot terminating in an enlarged circular opening 72. The slots 70 are aligned with the levers 58 so that each of the levers is positioned in the slot with the rear wall end of the circular openings 72 engaging the cam or heel 64 of the lever as best shown in Figs. 3 and 4. The forward half of the draw sleeve 68 is enlarged circumferentially as at 74 and terminates in a reduced threaded end 76, having an annular groove 77. The threaded end has an inwardly extending circumferential lip or flange 78 which defines an annular opening 79.

A clutch sleeve 80 is rotatably and axially supported on sleeve 54. Secured within the forward end of clutch sleeve 80 is a bushing 82 having an annular groove 84, and a reduced threaded extension 86. The clutch sleeve 80 has a circumferential lip 81 which is positioned in the annular groove 84 and locked to the bushing by an internally threaded ring 88 which is secured to the threaded extension 86. The bushing has a tapered opening 90 which cooperates with the rounded ends 66 of the levers 58. The bushing 82 forms an integral part of the clutch sleeve 80 and is rotatable and axially supported on the draw sleeve 68.

An internally threaded end cap 92 having a central opening 93 is threadedly secured to the threaded end 76. The end cap acts as a stop to limit the forward movement of the clutch sleeve 80 and its bushing 82. The central opening 93 in the end cap is in coaxial alignment with the bore of the split collet 40 to permit a tool to be inserted through the opening and retained by the collet. The shoulder 48 of the collet engages the lip of the draw sleeve 68 to limit its forward movement and the lip 50 of the collet extends into opening 79. An internally threaded adjustable lock nut 95 is in threaded engagement with the rear portion 18 of the body. A set screw 96 carried by the lock nut engages the circumferentially spaced slots on the body.

The operation of my device is as follows: The chuck is attached to the driving shaft 14 of the lathe through the bore 12.

The normal position of the parts of the chuck is as shown in Fig. 3, with the levers 58 pivoted inwardly and held thus by the bushing 82. In this position the cam or heel 64 of the levers engages the draw sleeve 68 to urge same rearwardly against the pressure of the spring 38 which engages the collet tube 40. With the draw sleeve 68 normally urged rearwardly the split collet tube 40 is urged inwardly into the bore 26 of the stem 16 and the collet tube is contracted to hold the tool tight therewithin. The collet 40 tapers along its length adjacent slots 42, consequently when it slides axially to the right in the bore 26 of stem 16 as viewed in Fig. 3, the body of the collet engages the front of bore 26 which is rearwardly of tapered surface 30 of the bore to collapse the collet.

To operate the chuck during rotation of the driving shaft, either for inserting or removing a tool, the clutch sleeve 80 is manually engaged and moved axially forwardly or to the left. The bushing 82 moves as part of the clutch sleeve 80. Since the clutch sleeve 80 and its bushing 82 is loosely rotatable on the sleeve 54 and draw sleeve 68 its manual engagement does not interfere with the continued rotation of the unit. Movement of the clutch sleeve 80 and bushing 82 axially forward or to the left as shown in Fig. 4 will move the tapered end of the bushing 82 clear of the levers 58 and with the spring 38 normally acting against the collet 40 to urge the draw sleeve 68 forwardly or to the left, the wall of the draw sleeve slot 72 will engage the cam or heel 64 of the lever to pivot them outwardly (Fig. 4). As the draw sleeve 68 moves forwardly or to the left with respect to the stem 16, the spring 38 urges the split collet 40 to the left moving it further out of the bore 26 and allowing it to expand to loosen its grip on the tool. The tool held in the collet may then be removed therefrom.

With the parts in this position a new tool may be inserted in the collet tube and by axially shifting the clutch sleeve 80 to the right the tool is tightened in the collet tube as follows:

The clutch bushing 82 which moves axially with the clutch sleeve through the tapered opening 90 engages the pair of levers 58 to pivot them inwardly, thereby causing the heels or cam of the levers to engage the draw sleeve 68 and move it rearwardly or to the right as shown. This movement of the draw sleeve 68 will urge the collet tube to the right or inwardly into the bore 26 of the stem 16 to tighten the collet tube and hold the tool in tight position.

The sleeve 54 is axially adjustable with respect to the body 10 by rotating same on the threaded members 20 and 52. The rotatable lock nut 95 locks the sleeve 54 in adjusted position. Adjustment of the sleeve 54 with respect to the body will vary the length of the sliding movement of the collet tube 40 with respect to the bore 24 and consequently increase or decrease the expansion of the mouth of the collet tube, permitting larger or smaller tools to be inserted.

In Fig. 6 there is shown a pair of interfitting collet tubes 40 and 40a. Collet 40a is constructed similar to collet 40 except it is of smaller size and is adapted to be inserted into collet 40 through the central opening 93 of the end cap 92 and to be retained in collet 40a.

Fig. 7 shows a modified construction in which the driving shaft 14a is provided with a central bore 24a to receive the coiled spring 38 and split collar 40. The driving shaft is threaded as at 14b for threaded engagement with the stem 16b of the chuck body 10b. In all other respects the construction is similar to that shown in the previous figures.

It will be understood that various changes and modifications may be made from the foregoing without departing from the spirit and scope of the appended claims.

I claim:

1. A collet chuck comprising a body having a cylindrical stem, said stem having a bore forming a collet receiving socket, an expandable and contractible collet extending thereinto, a spring member normally urging said collet forwardly out of said socket, a ring member secured to said body and pivotally supporting a plurality of levers, a draw sleeve axially slidable on said stem and engaging the forward end of said collet to retain same in said socket, said draw sleeve having slots cooperating with said levers, a hand engageable sleeve freely rotatable on said ring and draw sleeve and movable axially thereof and adapted when moved forwardly to permit said spring to urge said collet and said draw sleeve forwardly to position said collet in said socket to expand said collet and when said hand engageable sleeve is moved rearwardly to move said draw sleeve and said collet in said socket to contract same.

2. A collet chuck comprising a body having a cylindrical stem, said stem having a bore forming a collet receiving socket, an expandable and contractible collet extending thereinto, a spring member normally urging said collet forwardly out of said socket, a ring member secured to said body and pivotally supporting a plurality of slotted levers, a draw sleeve axially slidable on said stem and engaging the forward end of said collet to retain same in said socket, said draw sleeve having slots cooperating with said slotted levers, a hand engageable sleeve freely rotatable on said ring and draw sleeve and movable axially thereof and adapted when moved forwardly to permit said spring to urge said collet and said draw sleeve forwardly to position said collet in said socket to expand said collet and when said hand engageable sleeve is moved rearwardly to move said draw sleeve and said collet in said socket to contract same.

3. A collet chuck comprising a body having a cylindrical stem, said stem having a bore forming a collet receiving socket, an expandable and contractible collet extending thereinto, a spring member normally urging said collet forwardly out of said socket, a ring member secured to said body and pivotally supporting a plurality of levers, a draw sleeve axially slidable on said stem and engaging the forward end of said collet to retain same in said socket, said draw sleeve having slots cooperating with said levers, a hand engageable sleeve freely rotatable on said ring and draw sleeve and movable axially thereof and adapted when moved forwardly to permit said spring to urge said collet an said draw sleeve forwardly to position said collet in said socket to expand said collet and when said hand engageable sleeve is moved rearwardly to move said draw sleeve and said collet in said socket to contract same, and an adjustable lock nut on said body rearwardly of said ring member.

4. A collet chuck comprising a driving shaft having a bore forming a collet receiving socket, an expandable and contractible collet extending thereinto, a spring member normally urging said collet forwardly out of said socket, a body having a cylindrical stem secured to said driving shaft, a ring member secured to said body and pivotally supporting a plurality of levers, a draw sleeve axially slidable on said stem and engaging the forward end of said collet to retain same in said socket, said draw sleeve having slots cooperating with said levers, a hand engageable sleeve freely rotatable on said ring and movable axially thereof and adapted when moved forwardly to permit said spring to urge said collet and said draw sleeve forwardly to position said collet in said socket to expand said collet and when said hand engageable sleeve is moved rearwardly to move said draw sleeve and said collet in said socket to contract same.

References Cited in the file of this patent

UNITED STATES PATENTS

| Number | Name | Date |
|---|---|---|
| 714,896 | Hanson | Dec. 2, 1902 |
| 1,864,786 | Wilkins | June 28, 1932 |
| 2,363,411 | Goodwin | Nov. 21, 1944 |
| 2,441,644 | Mueller | May 18, 1948 |